Figure 4:
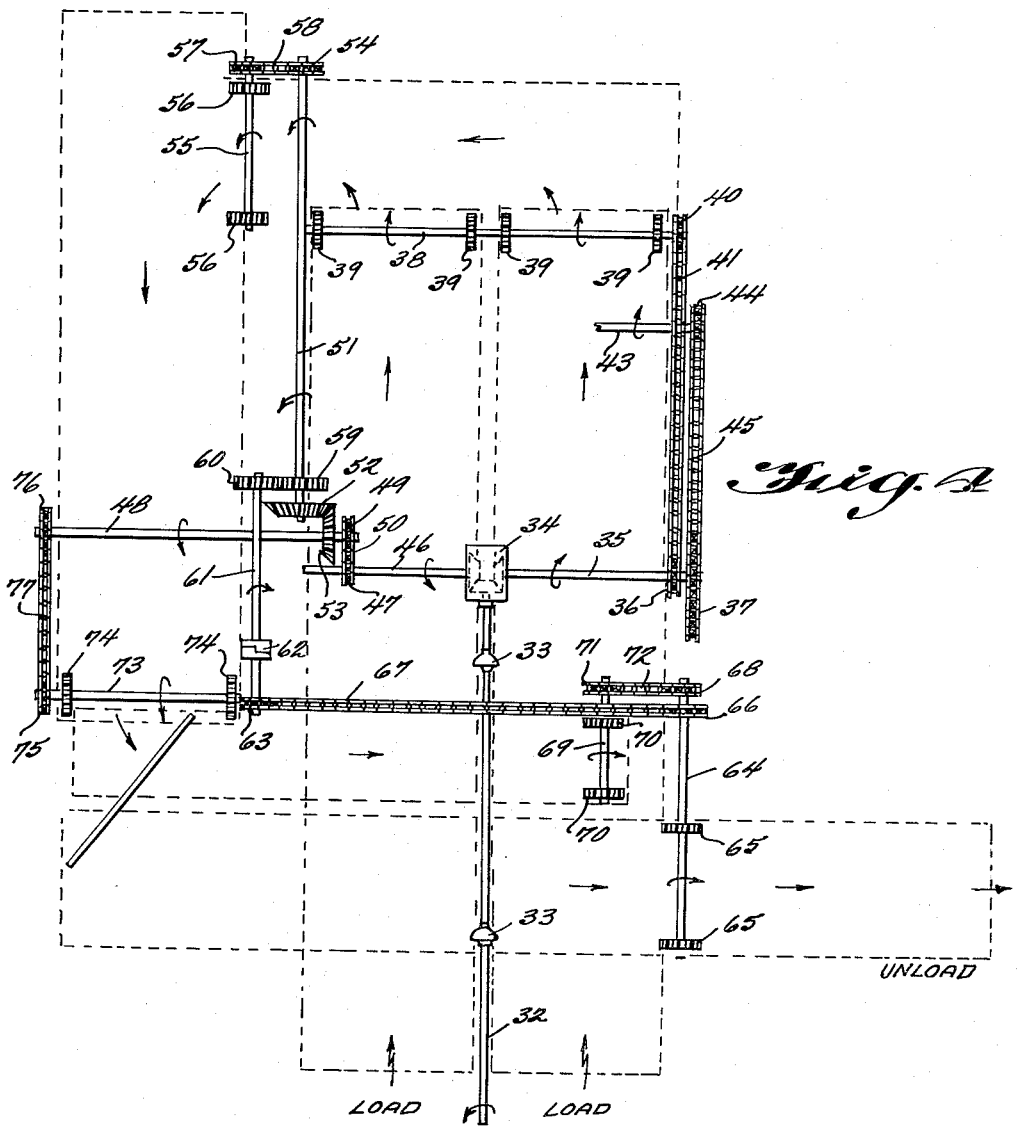

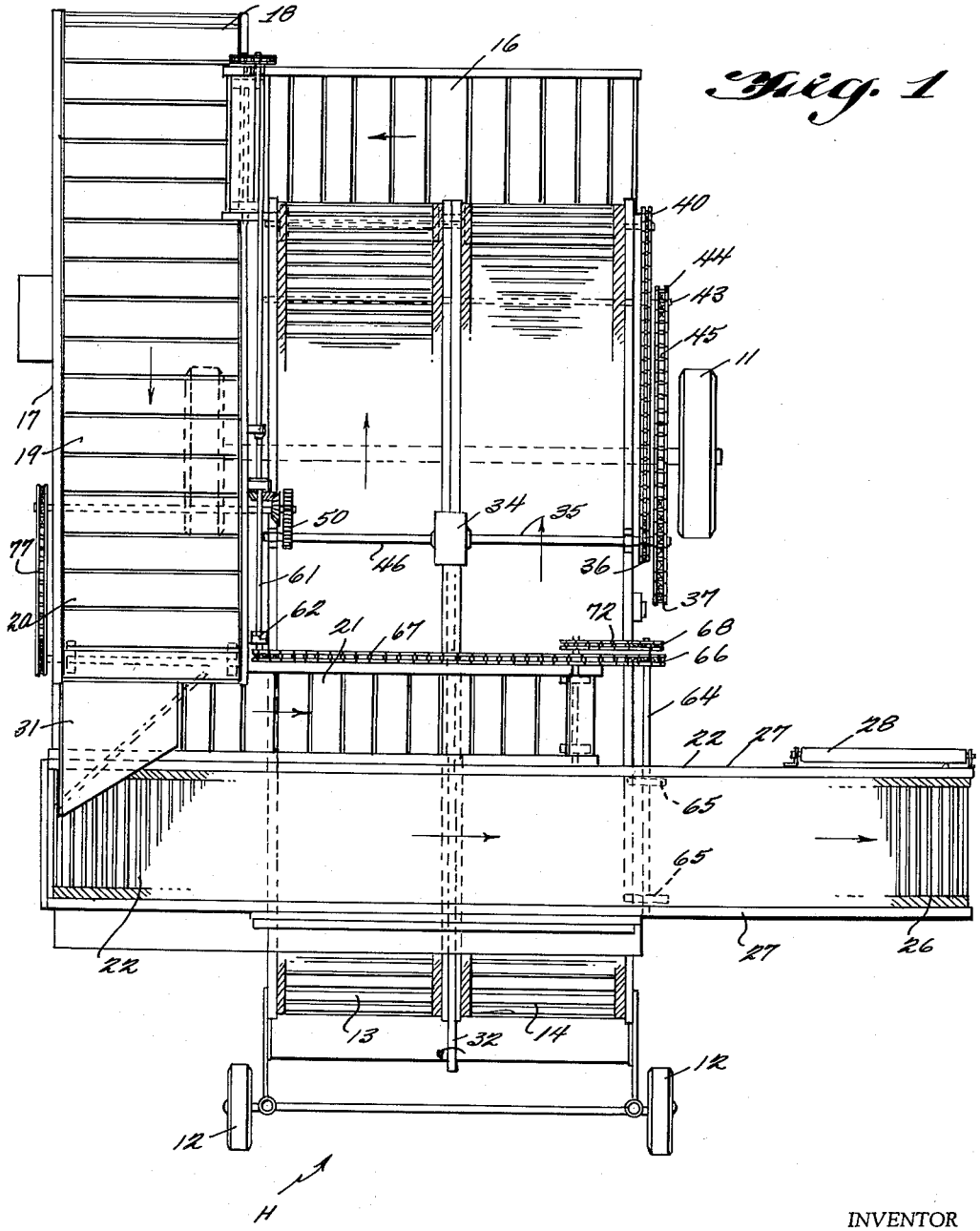

Aug. 22, 1961  F. J. RODIN  2,997,112
POTATO HARVESTER
Filed Feb. 10, 1959  4 Sheets-Sheet 2
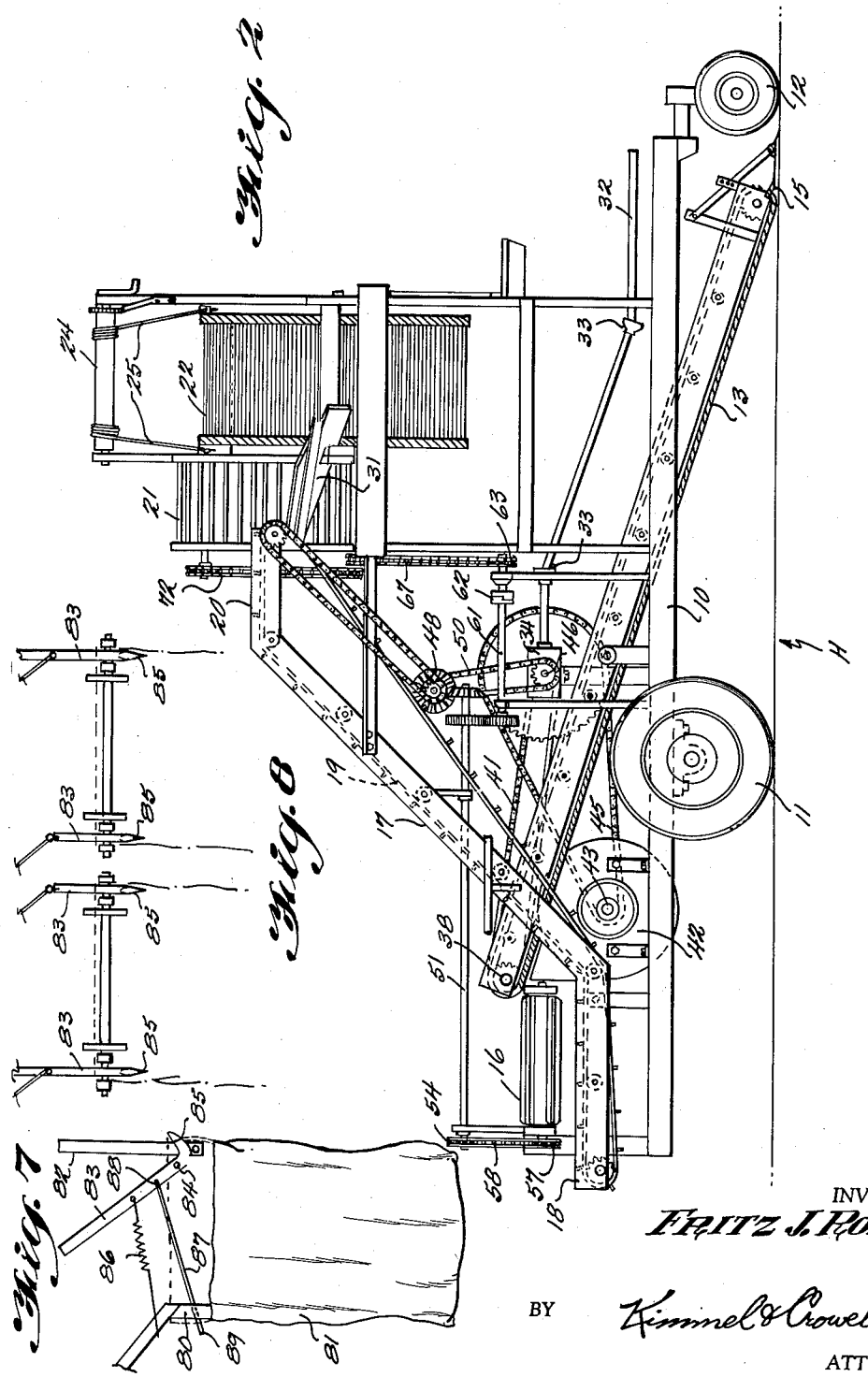
INVENTOR
*FRITZ J. RODIN*
BY *Kimmel & Crowell*
ATTORNEYS Aug. 22, 1961     F. J. RODIN     2,997,112
POTATO HARVESTER
Filed Feb. 10, 1959                                 4 Sheets-Sheet 3
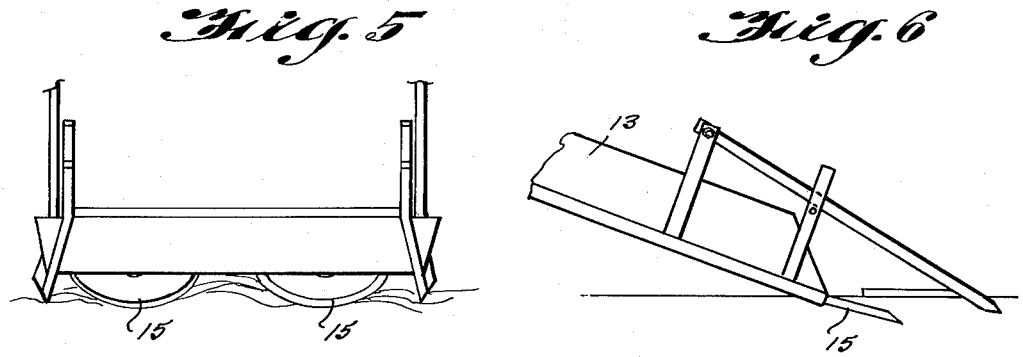
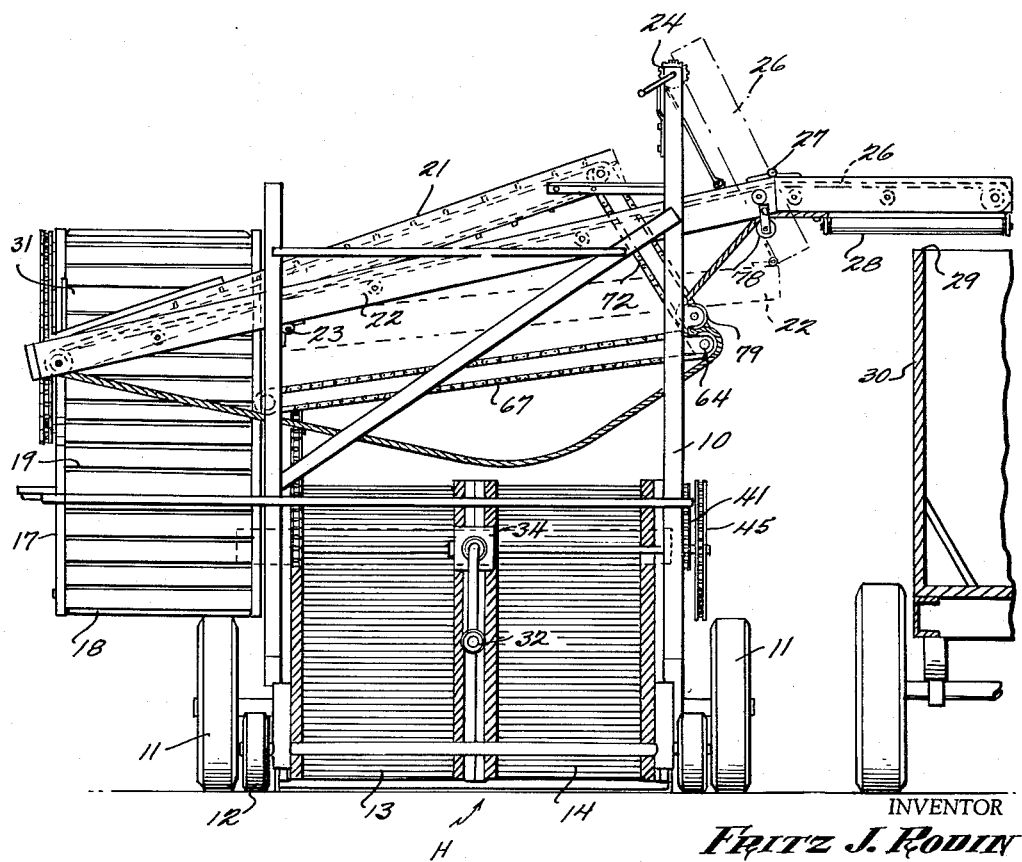
INVENTOR
FRITZ J. RODIN
BY Kimmel & Crowell
ATTORNEYS INVENTOR
Fritz J. Rodin
BY Kimmel & Crowell
ATTORNEYS

United States Patent Office 2,997,112
Patented Aug. 22, 1961

2,997,112
POTATO HARVESTER
Fritz J. Rodin, Chatham Center, N.Y.
Filed Feb. 10, 1959, Ser. No. 792,289
1 Claim. (Cl. 171—18)

The present invention relates to potato harvesters and particularly to an improvement on my co-pending application, Serial No. 431,381 filed May 21, 1954, now Patent Number 2,902,148 entitled Potato Harvester.

The primary object of the invention is to provide a potato harvester which will harvest potatoes, effectively separate them from the dirt and trash, and deposit the cleaned potatoes into the body of a truck, or wagon disposed adjacent to the harvester.

Another object of the invention is to provide a potato harvester of the class described above having dirt and trash conveying means positioned so that potatoes will not move thereover.

A further object of the invention is to provide a potato harvester of the class described above having a plurality of elevator conveyors positioned therein and interrelated to lift the potatoes from the ground to the point of discharge.

Other objects and advantages will become apparent in the following specification when considered in light of the attached drawings, in which:

FIGURE 1 is a top plan view of the invention;
FIGURE 2 is a side elevation of the invention;
FIGURE 3 is a front elevation of the invention with a fragmentary portion of a truck shown in transverse section adjacent thereto;
FIGURE 4 is a top plan view of the drive mechanism of the device with the conveyor structure shown in broken lines;
FIGURE 5 is a fragmentary front elevation of the harvester digger, forming a part of the invention;
FIGURE 6 is a fragmentary side elevation of the structure shown in FIGURE 5;
FIGURE 7 is a fragmentary side elevation of a bagging attachment; and
FIGURE 8 is a front elevation of the structure illustrated in FIGURE 7.

Referring now to the drawings in detail wherein like reference characters indicate like parts throughout the several figures, the reference character H indicates generally a potato harvester constructed in accordance with the invention.

The potato harvester H includes a frame structure 10 supported on a pair of relatively large rear wheels 11 and a pair of relatively small front wheels 12.

A pair of upwardly and rearwardly inclined conveyors 13, 14 are arranged in transversely aligned spaced apart relation and are supported on the frame 10.

A potato digger 15 is supported on the forward end of each of the conveyors 13, 14 and adapted to engage in the ground to dig and load potatoes on to the conveyors 13, 14. The conveyors 13, 14 terminate adjacent the rear of the frame 10 with their rear end portions overlying a transversely extending endless conveyor 16.

An elevator conveyor 17 has a generally horizontal rear end portion 18 underlying the discharge end of the transverse conveyor 16. The elevator conveyor 17 has an upwardly and forwardly sloping central portion 19 which terminates in a horizontal forward extension 20 carried on the upper end thereof.

A relatively steep transversely extending dirt conveyor 21 has its lower end underlying the discharge end of the elevator conveyor 17 and extends upwardly therefrom across the frame 10 of the harvester H. A potato conveyor 22 extends transversely of the frame 10, forwardly of the dirt conveyor 21, and closely adjacent thereto. The potato conveyor slopes somewhat less than the dirt conveyor 21 and has the lower end portion thereof secured to the frame 10 by a hinge 23. A winch 24 is carried by the frame 10 above the upper end of the potato conveyor 22 and has a cable 25 connected to the upper end of the potato conveyor 22 to permit the upper end of the potato conveyor 22 to be vertically adjusted as required.

A horizontal extension 26 is secured to the upper end of the potato conveyor 22 by a hinge 27 and is adapted to be folded into the dotted line position illustrated in FIGURE 3. The horizontal extension 26 is provided with a roller 28 on the lower surface thereof to engage the top edge 29 of a wagon body 30 arranged to underlie the discharge end of the potato conveyor 22.

A downwardly and forwardly sloping deflector plate 31 is secured to the frame 10 across the lower end of the dirt conveyor 21 to deflect potatoes rolling down the dirt conveyor 21 on to the potato conveyor 22, arranged adjacent thereto.

The mechanism of the potato harvester H is adapted to be driven from the power take-off of a tractor pulling the potato harvester over the ground. A drive shaft 32 extends from the forward end of the harvester H and is connected to the power take-off of the towing tractor (not shown) in a conventional manner. The drive shaft 32 is provided with a pair of universal joints 33 and is connected to a gear box 34 mounted centrally of the frame 10. A shaft 35 extends transversely from the gear box 34 and is journalled in the frame 10. The outer end of the shaft 35 has a relatively small sprocket 36 fixed thereto and outwardly thereof a relatively large sprocket 37 also fixed thereto. A shaft 38 extends transversely of the frame 10 adjacent the rear thereof and has a plurality of sprockets 39 fixed thereto for supporting and driving the conveyors 13, 14. A sprocket 40 is also fixed to the shaft 38 and is coupled to the sprocket 36 by a drive chain 41.

A blower 42 is fixed to the frame 10 between the discharge end of the elevators 13, 14 and the cross conveyor 16 to blow loose vines and dirt rearwardly over the cross conveyor, and has a shaft 43 forming a part thereof. The shaft 43 has a relatively small sprocket 44 fixed thereto and aligned with the relatively large sprocket 37 on the shaft 35. A drive chain 45 connects the relatively large sprocket 37 to the relatively small sprocket 44 to drive the blower 42 thereby.

A transversely extending shaft 46 has its inner end connected to the gear box 34 and is arranged in axially aligned relation to the shaft 35. The shaft 35 and the shaft 46 turn oppositely, for reasons to be assigned. The shaft 46 has a sprocket 47 mounted thereon adjacent the outer end thereof. A shaft 48 is journalled in the frame 10 parallel to and above the shaft 46 and spaced slightly rearwardly therefrom. A sprocket 49 is fixed to the shaft 48 in aligned relation to the sprocket 47 and is connected thereto by a drive chain 50.

A longitudinally extending horizontal shaft 51 is journalled in the frame 10 and is provided with a bevel gear 52 adjacent the forward end thereof. The shaft 48 has a bevel gear 53 fixedly secured thereto and meshing with the bevel gear 52 to drive the shaft 51 upon rotary movement of the shaft 48. A sprocket 54 is secured to the rear end of the shaft 51, as can be seen in FIGURE 4. A shaft 55 extends longitudinally of the harvester H and supports the conveyor 16 on a pair of drive sprockets 56 fixedly secured thereto in spaced relation. A sprocket 57 is also mounted on the shaft 55 in aligned relation to the sprocket 54 and is connected thereto by a drive chain 58.

A spur gear 59 is secured to the shaft 51 adjacent the bevel gear 52 and meshes with a spur gear 60 mounted on a longitudinally extending shaft 61, arranged parallel to and below the shaft 51. The shaft 61 has a friction clutch 62 mounted therein and is provided with a sprocket 63 at the forward end thereof. A longitudinally extending shaft 64 is journalled in the frame 10 on the side thereof opposite the shaft 61 and is provided with a pair of drive sprockets 65 supporting and driving the conveyor 22. A sprocket 66 is secured to the rear end of the shaft 64 in aligned relation to the sprocket 63 and is connected thereto by a drive chain 67. Another sprocket 68 is connected to the rear end of the shaft 64, for reasons to be assigned.

A longitudinally extending shaft 69 is supported in the frame 10 and carries a pair of spaced apart sprockets 70 supporting and driving the dirt conveyor 21. The shaft 69 has a sprocket 71 thereon arranged in aligned relation to the sprocket 68 and connected thereto by a chain 72.

A shaft 73 is journalled in the frame 10 in transversely extending relation on the side thereof opposite the shaft 64. A pair of drive sprockets 74 are fixed in spaced relation to the shaft 73 in supporting and driving relation to the conveyor 17. A sprocket 75 is fixed to the outer end of the shaft 73 in aligned relation to a sprocket 76 fixed to the outer end of the shaft 48 and connected thereto by a drive chain 77.

A longitudinally extending roller 78 is journalled under the hinge 27 of the conveyor 22 supporting the conveyor belt thereof. A roller 79 is journalled on the frame 10 in aligned relation to the roller 78 to support the conveyor belt 22 as it passes therearound. The roller 79 is positioned closely adjacent the sprockets 65 and assists in maintaining the belt 22 in engagement with the sprockets 65. In FIGURES 7 and 8 a bag supporting attachment is illustrated wherein a frame 80 supports the rear face of a bag 81 and a frame 82 forwardly spaced from the frame 80 supports the forward face of the bag 81. A pair of hooks 83 are pivoted at 84 to the frame 82 and are provided with arcuate sharpened end portions 85 arranged to pierce the upper forward edge of the bag 81, as illustrated in FIGURE 7.

A spring 86 normally biases the hook 83 into bag engaging position and a rod 87 has the forward end thereof pivotally secured at 88 to the hook 83 with the rear end thereof slidably carried in the frame 80. The rod 87 has the end 89 thereof sharpened to pierce the upper rear edge of the bag 81 to assist the hooks 83 in supporting the bag 81 on the frames 80, 82.

The device illustrated in FIGURE 7 may be attached to the discharge end of the potato conveyor 22 or may be secured to the truck or other apparatus with which the bags 81 may be used.

When it is desired to remove the bags 81 from the frames 80, 82 the hook 83 is swung forwardly on the pivot 84 pulling the arcuate end 85 and the end 89 respectively out of piercing engagement with the bag 81 so the bag 81 may slide downwardly off of the frames 80, 82. The bag 81 is attached to the frames 80, 82 by a reverse of the above operation.

In the use and operation of the invention, potatoes are dug by the diggers 15 and along with dirt, trash and similar material are moved upwardly on the conveyors 13, 14. All of the contents of the conveyors 13, 14 with the exception of some of the dirt which would fall through the conveyors 13, 14 is discharged at the rear thereof on the transverse conveyor 16. The transverse conveyor 16 discharges its contents on to the conveyor 17 where it is elevated to the upper forward portion of the harvester H. The elevator conveyor 17 discharges its contents on the dirt conveyor 21 with a portion of the contents running on to the potato conveyor 22. The dirt conveyor 21 slopes upwardly at a fairly sharp angle too steep for the potatoes to stay thereon. The dirt is conveyed upwardly on the dirt conveyor 21 and the potatoes roll downwardly thereon into engagement wtih the deflector plate 31 where they are deflected across to the potato conveyor 22. The potatoes are then conveyed across the conveyor 22 and discharged into a truck body 30 at the outer end thereof.

The potato conveyor 22 has the delivery end thereof vertically adjustable by means of the winch 24 to permit the use of the device with a plurality of varying height wagons, trucks and the like. Furthermore, the potato conveyor 22 can be folded to the dotted line position illustrated in FIGURE 3 to permit the movement of the potato harvester H from place to place along the highway.

This is an improvement of my previously mentioned Potato Harvester, or as they are more commonly called Potato-picker, Patent No. 2,902,148. Part of the improvement is in the change of construction by adding thereon an elevator described as the fourth elevator. Another part of the improvement is in the way the potatoes are on the fourth elevator removed from the dirt by rolling onto the fifth elevator as the potatoes are unable to go up the steep slope on the fourth elevator.

This is an improvement in removing a greater amount of dirt by the fourth elevator than will be possible by a conveyor belt of the same width used on potato diggers to remove dirt. Also, the dirt may be removed that is too wet to go through a belt ordinarily used to remove dirt on potato diggers. The cross members are low enough to allow potatoes to roll over and at the same time prevent the dirt from sliding back.

The forward end of the device may be set to any depth desired to pass underneath the potato vines. When spraying or when irrigating potatoes, a large amount of potato vines are forced down into the ground.

Some of the improvements on the device for bagging the potatoes are in the way of releasing the four hooks as it requires only one movement by simply pulling a bar forward for releasing all four hooks from the bag, and a spring pulls the bar and the four hooks back, ready for the next bag to hang up.

Having thus described the preferred embodiment of the invention, it should be understood that numerous structural modifications and adaptations may be resorted to without departing from the scope of the appended claims.

What is claimed is:

A potato harvester including a frame, a pair of upwardly and rearwardly sloping conveyors supported in said farme in transversely aligned relation, a transverse conveyor positioned under the rear end of said first named conveyors and discharging at one side of said frame, a longitudinally extending inclined elevator conveyor supported on said frame having its lower end underlying the discharge end of said transverse conveyor, a transversely extending inclined dirt conveyor supported in said frame and having its lower end underlying the discharge end of said elevator conveyor, said last mentioned conveyor sloping sharply upwardly, an inclined potato conveyor supported in said frame and extending transversely of said frame closely adjacent to said dirt conveyor sloping upwardly in the same direction as said last-mentioned dirt conveyor but at a more gentle slope, and an inclined plate extending across the lower end of said dirt conveyor for deflecting potatoes rolling down from said sharply sloping dirt conveyor on to said gently sloping potato conveyor at the lower end of said dirt conveyor.

References Cited in the file of this patent

UNITED STATES PATENTS

| | | |
|---|---|---|
| 1,554,550 | Berger | Sept. 22, 1925 |
| 1,895,268 | Silver | Jan. 24, 1933 |
| 2,027,840 | Rodin | Jan. 14, 1936 |
| 2,388,921 | Kooiker | Nov. 13, 1945 |
| 2,634,072 | Henry | Apr. 7, 1953 |
| 2,693,068 | Rodin | Nov. 2, 1954 |